Patented Sept. 22, 1942

2,296,712

UNITED STATES PATENT OFFICE 2,296,712

LAMINATED PRODUCT

Francis Ralph Grant and Thomas A. Tennyson, El Dorado, Ark., assignors to Lion Oil Refining Company, El Dorado, Ark., a corporation of Delaware No Drawing. Application September 28, 1939, Serial No. 296,924

8 Claims. (Cl. 154—50)

This invention relates to organic adhesive compositions, and with reference to certain more specific features, to bituminous adhesive compositions.

Among the several objects of the invention may be noted the provision of an organic adhesive composition which, when used, for example, in the lamination of paper, fabric, wood, and like materials, results in the improved securing together of the laminae, to such an extent that even the moistening of the laminated material does not cause the adhesive to become separated from the laminae; the provision of a bituminous adhesive composition of the class described which has improved adhesion, viscosity and hardness characteristics; the provision of simple and effective methods for making bituminous compositions of the class described; the provision of new and improved laminated products, wherein the laminae are paper, fabric, wood, or like types of material, and in which the laminae are so securely affixed together that moistening of the laminae, as by pasting together adjacent areas of laminated material with a water-soluble paste, has substantially no effect of causing the laminae to separate; and the provision of bituminous compositions and laminated products of the class described which are relatively simple and economical to make and which are reliable in use. Other objects will be in part obvious and in part pointed out hereafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

More specifically, asphalt adhesives are used to secure together laminae of laminated products such as laminated paper, fabric, wood, etc. Because of the water-proofing characteristics of organic adhesives, they are used very extensively in the manufacture of water-proof bags and containers and for other articles of commerce.

Usually in the manufacture of bags, for instance, the laminated stock from which the bag is ultimately to be made is first prepared in rolls, or the like. The bag-shapes are stamped or otherwise cut from such laminated stock material, and the bags are then folded together and pasted in the necessary regions. For various reasons, it is not considered expeditious, at the present time, to use asphalt adhesives for the pasting in the manufacture of the bag, and this is a point at which trouble has heretofore frequently arisen in connection with the use of asphalts or other bituminous adhesives for securing together the laminae of the stock. Water-soluble pastes or glues are preferred for this purpose, and the water of such pastes or glues, as it inevitably moistens at least one of the laminae, has resulted in the laminae, at the point of wetting, blistering or coming entirely away from the adhesive. It has appeared heretofore that this decrease, or total loss, of the adhesive quality of the organic water-proofing adhesive under conditions in the presence of moisture is an inherent defect of the adhesives used for this purpose, and heretofore this problem has not been solved. The present invention, for the first time, presents an organic adhesive composition which retains its adhesive qualities even when subjected to conditions of moisture, such as the condition outlined above. For example, when the paper stock is laminated together with an asphalt adhesive made in accordance with the present invention, the aforementioned difficulty is not encountered when bags are subsequently pasted up, using water-soluble pastes or glues, but, on the contrary, the adhesion between the laminae of the stock continues substantially undiminished.

It has heretofore been known that when a metallic soap, or water insoluble metallic compound, such as one of the aluminum stearates, is added to a mineral oil, the viscosity of the mineral oil increases. This statement holds true when a resin, or asphalt, or other organic water-proofing adhesive is the oil product to which the metallic soap is added. It is also well known that the addition of a metallic soap to a liquid or semi-liquid bituminous paving material, such as asphalt emulsion, cutback and light fluxes, tends to promote the adhesion of such paving materials to road building aggregate, especially to siliceous aggregates. However, in the latter instance the metallic soap is added either to the solvent used in the paving material, to the finished paving product, or it is applied to the aggregate previous to the addition of the paving material.

In prior art it is to be noted that the trivalent metals have been only physical admixtures with bituminous emulsions and cutbacks comprising water and low boiling point hydrocarbons, respectively.

A basic discovery, on which the present invention is based, is that if such a metallic soap or salt is added to the organic water-proofing adhesive, such as asphaltic flux or asphalt, before the blowing thereof or before other processes which require the heating of the two materials to a high temperature, a chemical reaction is apparently induced in the organic water-proofing material and the resultant modified adhesive is different in numerous characteristics. The operation carried on with an asphalt or asphaltic flux is typical of the process and therefore will be discussed in detail.

Following the procedure of the present invention, an important difference between the waterproofing adhesive now used and that made according to this invention is that the viscosity of the final material is greatly reduced. This is in contrast to previous bituminous compounds to which metallic soaps have been added.

More important, however, than the reduction in viscosity is the fact that the adhesion properties of the resultant asphalt, blown after the addition of the metallic soap, are tremendously improved. The blown asphalt product so made possesses so greatly improved adhesive properties, for example, that the trouble heretofore noted in connection with the application of moisture, is substantially minimized or entirely eliminated if the asphalt product of the present invention is used as the adhesive material.

Apparently substantially any asphalt, or asphaltic flux, can be used as a raw material for the composition of the present invention. For example, the present invention has been applied with success to both plain and asphaltic fluxes derived from Mid-Continent, Mexican and Smackover petroleums. Fluxes, asphaltic fluxes or asphalt may be used with equal facility, depending upon the desired consistency of the final products. A light asphalt flux is used when a final adhesive product of low temperature susceptibility is desired. Heavier asphaltic fluxes and asphalts are used when a hard adhesive of considerable strength is desired, or when a product of high temperature susceptibility is no disadvantage.

The most readily available, and highly satisfactory metallic soaps, for use in connection with the present invention, are the aluminum soaps, particularly the aluminum stearates and palmitates. Aluminum soaps of the lignite type, such as those soaps prepared by reacting aluminum salts with paper-mill sulphite waste liquors, are also satisfactory. Other trivalent metal soaps of the same general type, such as iron, lead, arsenic and antimony soaps, appear also to be useful. Furthermore, the soaps such as the palmitate and stearate of calcium appear likewise to be of use.

Even further, it may be noted that, in at least some instances, the metallic radical need not be added to the asphalt directly in the form of the soap. For example, in certain instances, metallic salts can be added directly to the asphalt. It appears that in such instances the metallic salts are satisfactory because of their tendency to form soaps or similar compounds with the naphthenic acid constituents of the asphalt base material.

The quantity of metallic soap, or soap-forming salt, thus to be added, varies from as low as $\frac{1}{10}$% of the total blend to as high as 10%, by weight.

The subsequent blowing of the mixture of asphalt (or asphaltic flux) and metallic soap (or soap-forming metallic salt) can be conducted in the usual manner for blowing asphalts of the particular type being used. The blowing is carried out with air or other oxidizing gas or agent, at superatmospheric temperatures, such as from the order of 300° F. to the order of 600° F., as is customary in the asphalt blowing art. The blowing may be continued, as usual, until the desired product is obtained, so far as its viscosity, hardness, and like characteristics are concerned.

The following are three illustrative, but non-limiting, examples of asphaltic adhesives prepared in accordance with the principles of the present invention.

*Example 1*

The following example concerns the preparation of an asphaltic adhesive for use in laminating paper, where the resultant laminated product is to be resistant to cold (in other words, the laminated product is to have a low temperature susceptibility factor).

As a bituminous base material, an asphaltic flux is made up from ninety percent Urbana flux having a 32 second float (A. S. T. M. Method) at 122° F., and a Saybolt furol viscosity of 464 seconds at 140° F., and ten percent of a lubricating oil distillate (of any suitable type) having a universal viscosity of 785 seconds at 100° F. The combination, or asphaltic flux, has a float of 25 seconds at 122° F., and a flash point of about 415° F.

If this asphaltic flux is blown in the usual manner, it produces a final blown asphalt having the following characteristics:

Softening point in glycerine (ring and ball method) 185° F.
Penetration (100 grams, 5 seconds), 39 mm./10 at 77° F.
Penetration (200 grams, 60 seconds), 28 mm./10 at 32° F.
Penetration (50 grams, 5 seconds), 63 mm./10 at 115° F.
Saybolt furol viscosity, 205 seconds at 325° F.

If, however, before the blowing, there is added to the asphaltic flux about one percent by weight of mono-aluminum stearate, the blown product is found to have the following characteristics:

Softening point glycerine (ring and ball method), 178°–179° F.
Penetration (100 grams, 5 seconds), 35 mm./10 at 77° F.
Penetration (200 grams, 60 seconds), 25 mm./10 at 32° F.
Penetration (50 grams, 5 seconds, 63 mm./10 at 115° F.
Saybolt Furol viscosity, 180 seconds at 325° F.

The adhesion qualities of the latter product, however, are immensely improved as compared to the former product. A simple experiment, such as the following, will adequately demonstrate these improved adhesion qualities.

Equal areas of ordinary kraft paper are laminated in the usual manner with equal quantities of the plain blown asphalt, as described above. A watery paste is then brushed over the external surface of one of the paper laminations and a plain sheet is glued to it. In the case of the ordinary blown asphalt, a total of about eighty percent of the area of the asphalt-bonded surface will come free, or blister. In the case of the aluminum stearate-containing asphalt, the area thus coming free or blistering is not in excess of about ten percent.

In both of the above instances, the blowing schedules were substantially identical, and were of the character ordinarily used on this type of asphalt. For example, the blowing started at about 415° F. and ended at about 500° F., and extended throughout a period of fifteen hours or so. Air was used as the oxidizing agent, and was admitted at the usual rate for blowing asphalt.

*Example 2*

In this example, the purpose is to prepare an asphaltic adhesive of a relatively hard character, to be used for laminating wood boards, veneer, and like materials.

The selected raw material is an asphalt derived from the petroleum obtained in the Schuler field, near El Dorado in the State of Arkansas. This asphalt has a penetration (100 grams, 5 seconds) of about 102 mm./10 at 77° F., a specific gravity of about 1.02, a flash point of about 700° F., and a softening point in water (ring and ball method) of about 111° F.

When this asphalt is blown for about five hours at 480° F. to about 560° F., without previously adding any metallic soap or soap-forming metallic salts, the resulting product has a softening point of about 190° F., and a penetration (100 grams, 5 seconds) of about 16 mm./10 at 77° F.

If, on the other hand, about one percent of mono-aluminum stearate, by weight, is added to the Schuler asphalt, and it is then blown in the same manner, the resulting product has a softening point, in glycerine (ring and ball method) of 185° to 187° F., and a penetration (100 grams, 5 seconds) of about 15.5 mm./10 at 77° F. The adhesion characteristics of the product, however, are far superior to those of the plain blown asphalt, as may be demonstrated, for example, by experiments similar to the one described above in connection with Example 1.

*Example 3*

The intention here is to produce a composition of intermediate hardness characteristics between the compositions of Examples 1 and 2. This composition may be used, for example, as adhesive for heavier papers than those for which the adhesive of Example 1 is designed, or for laminating paper to burlap, or the like.

As raw material, an asphaltic flux is made up using ninety percent of a Schuler asphaltic flux, having a 110 second float at 122° F., and a Saybolt furol viscosity of 212 seconds at 210° F., and ten percent of a lubricating oil distillate having a universal viscosity of 730 seconds at 100° F. The resulting asphaltic flux has a float of 74 seconds at 122° F., a Saybolt furol viscosity of 135 seconds at 210° F., and a flash point (Cleveland open cup method) of 525° F.

When this fluxed asphalt is blown for a suitable length of time at a temperature of 480°–500° F., without the previous addition thereto of any metal soap or soap-forming metal salt, the resulting product has the following characteristics:

Softening point glycerine (ring and ball method) 180° F.
Penetration (100 grams, 5 seconds), 33 mm./10 at 77° F.
Penetration (50 grams, 5 seconds), 59 mm./10 at 115° F.
Penetration (200 grams, 60 seconds), 18 mm./10 at 32° F.
Saybolt furol viscosity, 314 seconds at 325° F.

If one percent, by weight, of mono-aluminum stearate, however, is added to the asphalt, and the blowing schedule is then carried out in the same manner, a product of the following characteristics results:

Softening point glycerine (ring and ball method) 180° F.
Penetration (100 grams, 5 seconds), 30 mm./10 at 77° F.
Penetration (70 grams, 5 seconds), 50 mm./10 at 115° F.
Penetration (200 grams, 60 seconds), 16 mm./10 at 32° F.
Saybolt furol viscosity, 250 seconds at 325° F.

The adhesion characteristics of the latter product are tremendously improved as compared to the former, as may be demonstrated by experiments similar to the one described in connection with Example 1.

The adhesives prepared in accordance with the present invention may be used in the customary manner for laminating together whatever materials are desired. For example, in laminating layers of paper, or of paper and fabric, and the like, the adhesive is merely spread between the layers of paper or fabric in the usual manner, and the layers are then thoroughly pressed together, as by rollers. The resultant laminated product, as heretofore described, is characterized in the firmness with which its laminae are adhered together, and the further characteristic that the laminae do not come apart even when one or more of them is moistened.

A laminated product can be made up with three or more paper layers, two of which are laminated with an asphalt adhesive of the type herein described, and the third of which is laminated to the other two by a water-soluble paste or glue. Such a product is readily and feasibly produced using the asphaltic adhesive of the present invention; it is entirely impossible to produce, from a practical standpoint, using prior types of asphalt adhesive compounds.

While the product of the present invention appears to have its chief utility in connection with asphaltic adhesives, it is likewise of improved characteristics for use in other fields, such as paving, and the manufacture of roofing materials.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. A laminated product comprising a plurality of laminae of paper, fabric, wood, or like materials, and a layer of adhesive between said laminae securing them together, said adhesive comprising the product obtained by blowing a bituminous material of the class consisting of asphalts and asphaltic fluxes, wtih approximately 1 to 10% of a trivalent metal soap, said product being characterized in that its laminae do not separate substantially even when wet with water.

2. A laminated product comprising a plurality of laminae of paper, fabric, wood, or like materials, and a layer of adhesive between said laminae securing them together, said adhesive comprising the product obtained by blowing and reacting a bituminous material of the class consisting of asphalts and asphaltic fluxes, with approximately 1 to 10% of a trivalent metallic soap.

3. A laminated product comprising a plurality of laminae of paper, fabric, wood, or like materials, and a layer of adhesive between said laminae securing them together, said adhesive comprising the product obtained by blowing a bituminous material of the class consisting of asphalts and asphaltic fluxes, with approximately 1 to 10% of a trivalent metallic soap.

4. A laminated product comprising a plurality of laminae of paper, fabric, wood, or like materials, and a layer of adhesive between said laminae securing them together, said adhesive comprising the product obtained by blowing a bituminous material of the class consisting of asphalts and asphaltic fluxes, with approximately 1 to 10% of an aluminum stearate.

5. A laminated product comprising at least three laminae of paper, fabric, wood, or like materials, a layer of bituminous adhesive between two of said laminae securing them together, said bituminous adhesive comprising the product obtained by blowing a bituminous material of the class consisting of asphalts and asphaltic fluxes, with approximately 1 to 10% of a trivalent metal soap, and a layer of water-soluble adhesive between the third lamina and one of the said two laminae, securing them together.

6. A laminated product comprising at least three laminae of paper, fabric, wood, or like materials, a layer of bituminous adhesive between two of said laminae securing them together, said bituminous adhesive comprising the product obtained by blowing a bituminous material of the class consisting of asphalts and asphaltic fluxes, with approximately 1 to 10% of a metallic soap, and a layer of water-soluble adhesive between the third lamina and one of the said two laminae, securing them together.

7. A laminated product comprising at least three laminae of paper, fabric, wood, or like materials, a layer of bituminous adhesive between two of said laminae securing them together, said bituminous adhesive comprising the product obtained by blowing a bituminous material of the class consisting of asphalts and asphaltic fluxes, with approximately 1 to 10% of a trivalent metallic soap, and a layer of water-soluble adhesive between the third lamina and one of the said two laminae, securing them together.

8. A laminated product comprising at least three laminae of paper, fabric, wood, or like materials, a layer of bituminous adhesive between two of said laminae securing them together, said bituminous adhesive comprising the product obtained by blowing a bituminous material of the class consisting of asphalts and asphaltic fluxes, with approximately 1 to 10% of an aluminum stearate, and a layer of water-soluble adhesive between the third lamina and one of the said two laminae, securing them together.

FRANCIS RALPH GRANT.
THOMAS A. TENNYSON.